(12) United States Patent
Emoto et al.

(10) Patent No.: US 10,669,476 B2
(45) Date of Patent: Jun. 2, 2020

(54) POTASSIUM FLUOROMANGANATE FOR USE AS RAW MATERIAL OF MANGANESE-ACTIVATED COMPLEX FLUORIDE PHOSPHOR AND MANGANESE-ACTIVATED COMPLEX FLUORIDE PHOSPHOR PRODUCTION METHOD USING SAME

(71) Applicant: DENKA COMPANY LIMITED, Chuo-ku, Tokyo (JP)

(72) Inventors: Hideyuki Emoto, Omuta (JP); Motonori Kino, Machida (JP); Masayoshi Ichikawa, Omuta (JP)

(73) Assignee: DENKO COMPANY LIMITED, Tokyo (JP)

( * ) Notice: Subject to any disclaimer, the term of this patent is extended or adjusted under 35 U.S.C. 154(b) by 337 days.

(21) Appl. No.: 15/720,900

(22) Filed: Sep. 29, 2017

(65) Prior Publication Data
US 2018/0094188 A1    Apr. 5, 2018

(30) Foreign Application Priority Data

Oct. 4, 2016   (JP) ................................ 2016-196717

(51) Int. Cl.
   *C09K 11/61*        (2006.01)
(52) U.S. Cl.
   CPC .......... *C09K 11/616* (2013.01); *C09K 11/617* (2013.01)
(58) Field of Classification Search
   CPC .......................... C09K 11/616; C09K 11/617
   See application file for complete search history.

(56) References Cited

U.S. PATENT DOCUMENTS

| | | |
|---|---|---|
| 3,576,756 A | 4/1971 | Russo |
| 2012/0256125 A1 | 10/2012 | Kaneyoshi et al. |
| 2015/0076406 A1* | 3/2015 | Zhou ................... C09K 11/576 252/301.4 F |
| 2015/0232751 A1* | 8/2015 | Lin ........................ C09K 11/65 359/885 |
| 2017/0066964 A1 | 3/2017 | Kaneyoshi et al. |

FOREIGN PATENT DOCUMENTS

| | | |
|---|---|---|
| CN | 104789214 | 4/2015 |
| JP | 4582259 | 11/2010 |

OTHER PUBLICATIONS

Shin-Jikken Kagaku Kōza 8 "Muki Kagōbutsu no Gōsē III"[New Experimental Chemistry Lectures 8 "Synthesis of Inorganic Compounds III"], published by Maruzen, edited by The Chemical Society of Japan, published 1977, page 1166, concise English explanation attached.

H. Bode, H. Jensen and F. Bandte, "Über eine neue Darstellung des Kalium-hexafluoromanganats(IV)," Angew. Chem., 1953, 65(11):304.

* cited by examiner

*Primary Examiner* — C Melissa Koslow
(74) *Attorney, Agent, or Firm* — Rudy J. Ng; Bozicevic, Field & Francis LLP

(57) ABSTRACT

The purpose of the present invention is to provide a potassium fluoromanganate for use as a raw material for a manganese-activated complex fluoride phosphor, from which a manganese-activated complex fluoride phosphor having good fluorescence properties and reliability can be produced.

The potassium fluoromanganate of the present invention is characterized in that, in an orbital electron binding energy spectrum diagram for manganese obtained by X-ray photoelectron spectroscopy, a ratio (signal intensity value A/signal intensity value B) between a signal intensity value A obtained by subtracting a background value from a maximum signal intensity value for binding energy values within the range from 643.0 eV or more to 644.0 eV or less, and a signal intensity value B obtained by subtracting the background value from a maximum signal intensity value for binding energy values within the range from 645.0 eV or more to 646.0 eV or less, is greater than 0 and no greater than 0.9.

1 Claim, 3 Drawing Sheets

POTASSIUM FLUOROMANGANATE FOR USE AS RAW MATERIAL OF MANGANESE-ACTIVATED COMPLEX FLUORIDE PHOSPHOR AND MANGANESE-ACTIVATED COMPLEX FLUORIDE PHOSPHOR PRODUCTION METHOD USING SAME

BACKGROUND OF THE INVENTION

Technical Field

The present invention relates to a potassium fluoromanganate for use as a raw material of a manganese-activated complex fluoride phosphor and a manganese-activated complex fluoride phosphor production method using the same.

Background Art

In recent years, white light-emitting diodes (white LEDs) that combine light-emitting diodes (LEDs) with phosphors have come into widespread use as backlight lighting sources for use in liquid crystal displays. The phosphors that are used in liquid crystal backlight applications are required to have high color purity in order to reproduce a wide range of colors in chromaticity coordinates, and phosphors having a sharp emission spectrum are desired in view of the compatibility of combinations with color filters.

In general, phosphors have a structure wherein a substance that controls light emission (emission centers, also known as activators) is contained, as a solid solution, in a crystal that serves as a host (host crystal). Additionally, the process of adding emission centers, as a solid solution, to a host crystal, and thereby providing a fluorescence function, is also known as activation. The manganese-activated complex fluoride phosphor in the present invention is a general name for phosphors having tetravalent manganese ions (also denoted as $Mn^{4+}$) as emission centers, represented by the general formula: $A_2MF_6:Mn^{4+}$, where the element A is an alkali metal element including at least K, the element M is one or more metal elements chosen from among Si, Ge, Sn, Ti, Zr and Hf, and the element F is fluorine.

Examples of emission centers for phosphors having a sharp red emission spectrum include $Eu^{3+}$ and $Mn^{4+}$. When a complex fluoride host crystal, for example, a host crystal of potassium hexafluorosilicate represented by the general formula $K_2SiF_6$, is activated by adding $Mn^{4+}$ as a solid solution, a representative manganese-activated complex fluoride phosphor that is expressed by the general formula $K_2SiF_6:Mn^{4+}$, which is efficiently excited by blue light and has a sharp red emission spectrum having a narrow half-width, is obtained, and progress is being made towards the application thereof to white LEDs. In the present invention, the word "manganese" refers to manganese in general, without specifically designating the valence thereof.

Production methods for manganese-activated complex fluoride phosphors, of which the aforementioned $K_2SiF_6:Mn^{4+}$ is a representative example, include a method of dissolving the elements constituting the phosphor in an aqueous hydrofluoric acid solution and precipitating out the phosphor by mixing two or more types of aqueous solutions or by reacting the aqueous solution with a solid raw material (Patent Document 1), and a method of precipitating out the phosphor by adding a poor solvent thereof to the hydrofluoric acid solution containing the phosphor raw materials (Patent Document 2). In these methods, the raw material that is used as the manganese source in the manganese-activated complex fluoride phosphor is potassium fluoromanganate, represented by the general formula $K_2MnF_6$, which has a crystal structure similar to that of $K_2SiF_6$ and dissolves in an aqueous hydrofluoric acid solution to generate $MnF_6^{2-}$. Known methods for producing potassium fluoromanganate include the Bode method (Non-Patent Document 1) and electrolytic deposition (Patent Document 3 and Non-Patent Document 2).

SPECIFIC RELATED ART

Patent Documents

Patent Document 1: JP 4582259 B
Patent Document 2: U.S. Pat. No. 3,576,756 A
Patent Document 3: JP 5845999 B Non-Patent Documents Non-Patent Document 1: H. Bode, H. Jensen and F. Bandte, *Angew. Chem.*, 1953, 304.
Non-Patent Document 2: *Shin-Jikken Kagaku Kōza* 8 "*Muki Kagōbutsu no Gōse III*" [New Experimental Chemistry Lectures 8 "Synthesis of Inorganic Compounds III"], published by Maruzen, edited by The Chemical Society of Japan, published 1977, page 1166.

BRIEF SUMMARY OF THE INVENTION

Further improvements are sought in conventional manganese-activated complex fluoride phosphors represented by $K_2SiF_6:Mn^{4+}$, in terms of the fluorescence properties indicated by the absorption rate, the internal quantum efficiency and the external quantum efficiency, as well as the reliability of the phosphor, such as the thermal stability and the humidity resistance. The purpose of the present invention is to provide a potassium fluoromanganate that is indicated by the general formula $K_2MnF_6$, for use as a raw material for a manganese-activated complex fluoride phosphor, from which a manganese-activated complex fluoride phosphor having good fluorescence properties and reliability can be produced, and to provide a manganese-activated complex fluoride phosphor production method using the aforementioned potassium fluoromanganate as a raw material.

As a result of performing diligent research focusing on manganese raw materials that can serve as sources for supplying $Mn^{4+}$ for forming the emission centers in manganese-activated complex fluoride phosphors, i.e., potassium fluoromanganates for use as the raw materials in manganese-activated complex fluoride phosphors, the present inventors newly discovered that, even among potassium fluoromanganates represented by the same general formula $K_2MnF_6$, the electronic state of the manganese contained in the potassium fluoromanganate, as measured by X-ray photoelectron spectroscopy (also known as XPS), may sometimes differ, and furthermore, the differences in the electronic state of the manganese can affect the properties of the ultimately obtained manganese-activated complex fluoride phosphor.

Additionally, the present inventors discovered an indicator value, based on measurement values from X-ray photoelectron spectroscopy, that characterizes the differences in the electronic states of the manganese in the potassium fluoromanganates, and made it possible to identify, by using the aforementioned indicator value, potassium fluoromanganates for use as raw materials to obtain manganese-activated complex fluoride phosphors with improved reliability in high-temperature or high-humidity environments, thereby bringing the present invention to completion. Furthermore, the present inventors succeeded in inventing a method for producing a manganese-activated complex fluoride phosphor that uses the aforementioned potassium fluoromanganate as a raw material.

(1) In other words, the present invention is directed to a potassium fluoromanganate for use as a raw material for a manganese-activated complex fluoride phosphor wherein, in an orbital electron binding energy spectrum diagram for manganese obtained by X-ray photoelectron spectroscopy, a ratio (signal intensity value A/signal intensity value B) between a signal intensity value A obtained by subtracting a background value from a maximum signal intensity value for binding energy values within the range from 643.0 eV or more to 644.0 eV or less, and a signal intensity value B obtained by subtracting the background value from a maximum signal intensity value for binding energy values within the range from 645.0 eV or more to 646.0 eV or less, is greater than 0 and no greater than 0.9.

(2) The present invention is directed to the potassium fluoromanganate according to (1), wherein the manganese-activated complex fluoride phosphor described in (1) is a manganese-activated complex fluoride phosphor having, as a host crystal, a potassium hexafluorosilicate represented by the general formula $K_2SiF_6$.

(3) The present invention is directed to a manganese-activated complex fluoride phosphor production method wherein the potassium fluoromanganate according to (1) or (2) is used as a raw material for producing the manganese-activated complex fluoride phosphor.

(4) Additionally, the present invention is directed to the manganese-activated complex fluoride phosphor production method according to (3), wherein crystals of the manganese-activated complex fluoride phosphor are precipitated in a hydrofluoric acid solution in which the potassium fluoromanganate is dissolved.

(5) Furthermore, the present invention is directed to the manganese-activated complex fluoride phosphor production method according to (3) or (4) wherein, during a step of dissolving a solid silica in an aqueous solution containing at least potassium and fluorine, an operation of adding potassium fluoromanganate to the aqueous solution is performed, and the manganese-activated complex fluoride phosphor is precipitated out while dissolution of the solid silica into the aqueous solution progresses at the same time.

By using the potassium fluoromanganate of the present invention as a raw material for a manganese-activated complex fluoride red phosphor, it is possible to produce and obtain a manganese-activated complex fluoride red phosphor having excellent fluorescence properties and excellent heat and humidity resistance.

DETAILED DESCRIPTION OF THE INVENTION

One embodiment of the present invention is a potassium fluoromanganate represented by the general formula $K_2MnF_6$, having a specified range of indicator values obtained by X-ray photoelectron spectroscopy. The potassium fluoromanganate of the present invention is preferably in a state such that, when dissolved, for example, in an aqueous hydrofluoric acid solution, $MnF_6^{2-}$ complex ions are generated.

Generally speaking, X-ray photoelectron spectroscopy is a method of measuring the kinetic energies of photoelectrons ejected from the surface of a test sample when the sample is irradiated with soft X-rays while placed in an ultrahigh vacuum, and using the kinetic energies to determine the binding energies of orbital electrons in elements constituting the test sample. The orbital electron binding energies are specific to the type of element and vary depending on the chemical state of each element, so they can provide information regarding the elemental composition and chemical binding state of the test sample. Examples of soft X-rays that are used for X-ray photoelectron spectroscopy include Al-Kα (1486.6 eV) and Mg-Kα (1253.6 eV).

In an orbital electron binding energy spectrum diagram for manganese obtained by X-ray photoelectron spectroscopy (in other words, a diagram showing the relationship between the binding energies (in units of eV) of the orbital electrons of manganese determined from the measured kinetic energies of ejected photoelectrons and signal intensity values corresponding to the number of ejected photoelectrons that are measured), the $Mn2p_{3/2}$ orbital electrons in manganese in the metal state generally exhibit a peak at a position with binding energies near 639 eV. Additionally, it is described, in the below-cited reference document, that when manganese is in an oxide state, the peak occurs at around 641 to 643 eV, though there will be differences depending on the valence of the manganese, and in the case of $MnF_3$, the peak occurs at around 642 to 643 eV. (Reference Document) J. F. Moulder, W. F. Stickle, P. E. Sobol, K. B. Bomben, *Handbook of X-ray Photoelectron Spectroscopy*, ed. by J. Chastain, 2nd ed., Perkin-Elmer (1992).

Figure 1:
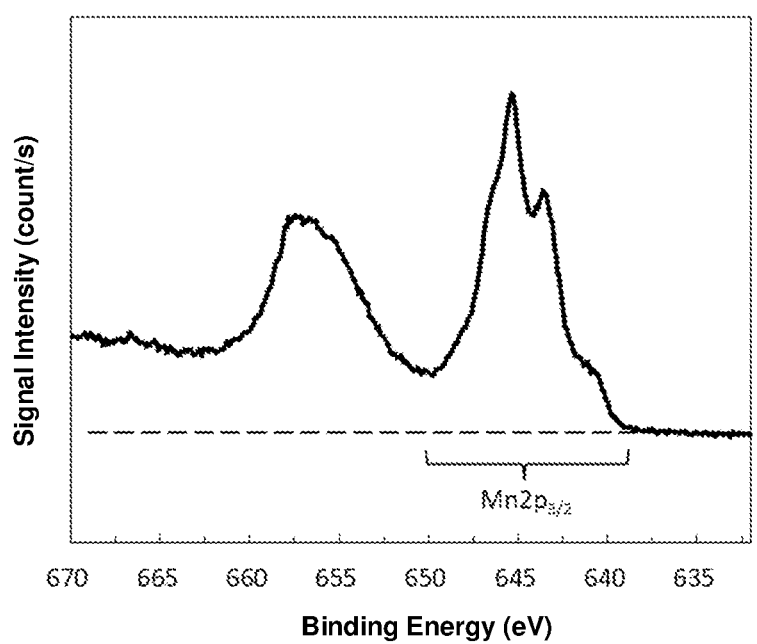
FIG. 1 is an XPS spectrum diagram of Mn2p in a potassium fluoromanganate according to Example 1.

In an orbital electron binding energy spectrum diagram relating to manganese contained in potassium fluoromanganate represented by the general formula $K_2MnF_6$, as shown in FIG. 1, there are multiple peaks within the range of approximately 640 to 650 eV, particularly centered in the vicinity of 645 eV, that can be interpreted as being associated with $Mn2p_{3/2}$ orbital electrons, as shown in FIG. 1. Although the manganese in potassium fluoromanganate is normally assumed to be present in the state of tetravalent ions (i.e., $Mn^{4+}$), these measurement results suggest that the manganese is not all in the state of tetravalent ions, but is rather present in multiple valence states.

Conventionally, potassium fluoromanganate was used as a raw material for manganese-activated complex fluoride phosphors, but it was not known that the specific attributes of the potassium fluoromanganate can affect the properties of the phosphors later on. The present invention was developed as a result of investigating, on the basis of binding energy spectrum diagrams of manganese obtained by X-ray photoelectron spectroscopy relating to potassium fluoromanganate, the relationship between the shape of the spectrum diagram and the fluorescence properties and the reliability, in high-temperature and high-humidity environments, of the ultimately obtained phosphors, which led to the new discovery of an indicator value, relating to the potassium manganate that is used as the raw material, by which a manganese-activated complex fluoride phosphor having excellent properties can be obtained.

Figure 2:
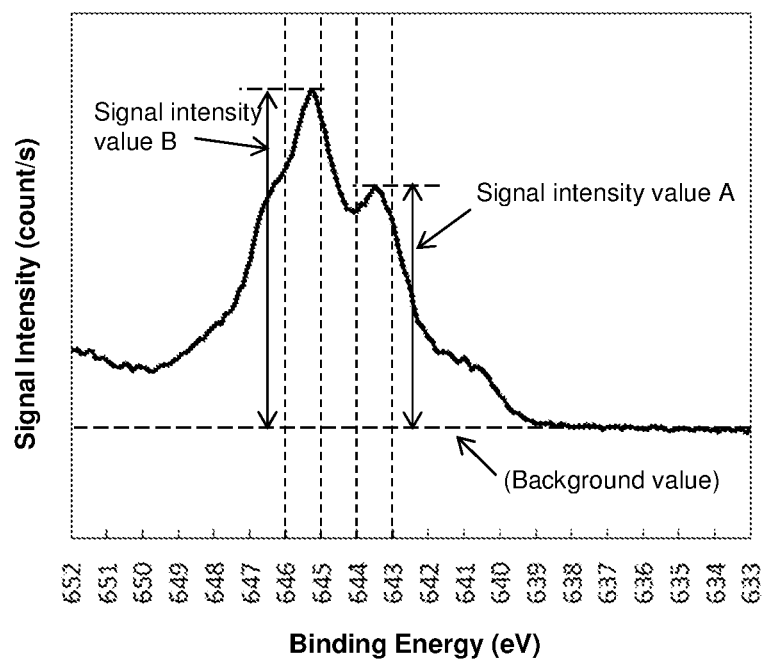
FIG. 2 is an XPS spectrum diagram of $Mn2p_{3/2}$ in a potassium fluoromanganate according to Example 1.
Figure 3:
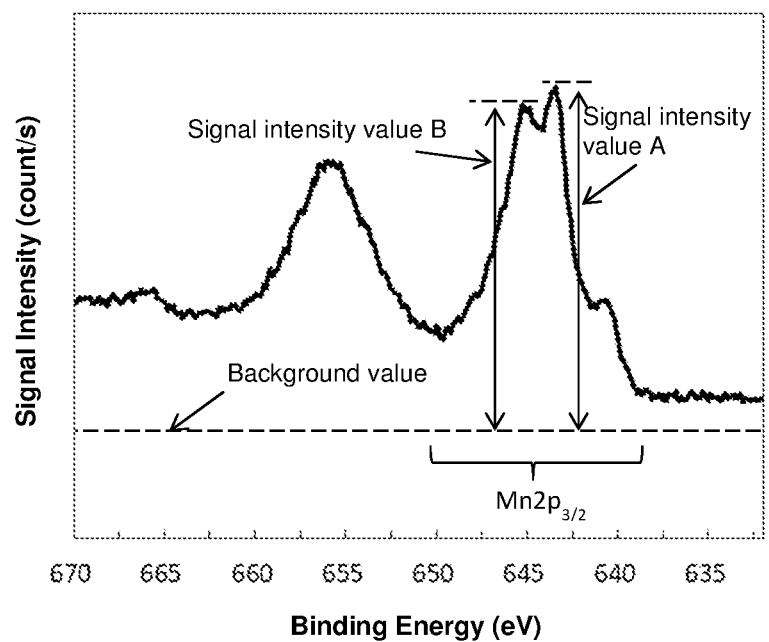
FIG. 3 is an XPS spectrum diagram of Mn2p in a potassium fluoromanganate according to Comparative Example 1.

In other words, the aforementioned indicator value is a ratio (A/B), in a binding energy spectrum diagram for manganese obtained by X-ray photoelectron spectroscopy, as shown in FIG. 2, which is an enlargement of a portion of FIG. 1, between a signal intensity value (A) obtained by subtracting a background value from a maximum signal intensity value for binding energy values within the range from 643.0 eV or more to 644.0 eV or less, and a signal intensity value (B) obtained by subtracting the background value from a maximum signal intensity value for binding energy values within the range from 645.0 eV or more to 646.0 eV or less, and in order to obtain a manganese-activated complex fluoride phosphor having excellent properties, the ratio (A/B) must be greater than 0 and no greater than 0.9.

An example of a method for producing the potassium fluoromanganate for use as a raw material for a manganese-activated complex fluoride phosphor according to the present invention will be indicated below. However, the method for obtaining the potassium fluoromanganate of the present invention is not limited thereto, and conventionally known methods or appropriate combinations thereof may be used as long as the value of the ratio (A/B) for the potassium fluoromanganate as defined in the present invention is within the range of the present invention.

The potassium fluoromanganate of the present invention can be produced, for example, based on the Bode method, while further controlling the synthesis conditions thereof more precisely. The Bode method is a method wherein potassium permanganate and large quantities of potassium fluoride or potassium hydrogenfluoride are dissolved in an aqueous hydrofluoric acid solution, a hydrogen peroxide solution is dripped therein to reduce the manganese ions in the aqueous solution from heptavalent to tetravalent so as to form $MnF_6^{2-}$ complex ions, and the complex ions react with the potassium ions that are present in large quantities in the aqueous solution, thereby finally causing saturation and precipitation of the potassium fluoromanganate.

According to the investigations by the present inventors, it was discovered that the potassium fluoromanganate of the present invention can be obtained by making the hydrogen fluoride concentration in the aqueous hydrofluoric acid solution as high as possible, and further making the temperature of the aqueous solution as low as possible. Specifically, the hydrogen fluoride concentration in the aqueous hydrofluoric acid solution is preferably 50 mass % or more, and more preferably 60 mass % or more. The temperature during precipitation of the potassium fluoromanganate is preferably 5° C. or lower, and more preferably 0° C. or lower.

When a manganese-activated complex fluoride phosphor is synthesized by using the potassium fluoromanganate of the present invention as a raw material, a phosphor having excellent fluorescence properties and reliability can be obtained. The host crystal for this complex fluoride phosphor is preferably potassium hexafluorosilicate, which is efficiently excited by blue light and emits red light having high color purity in the vicinity of wavelength 630 nm, and which has relatively good humidity resistance and thermal stability among complex fluorides.

Another embodiment of the present invention is a manganese-activated complex fluoride phosphor production method wherein the potassium fluoromanganate of the present invention is used as a raw material for producing the manganese-activated complex fluoride phosphor. In this production method, crystals of the manganese-activated complex fluoride phosphor are preferably precipitated in a hydrofluoric acid solution in which the potassium fhoromanganate of the present invention has been dissolved.

Additionally, the production method is preferably a method wherein, during a step of dissolving a solid silica in an aqueous solution containing at least potassium and fluorine, an operation of adding potassium fluoromanganate to the aqueous solution is performed, and the manganese-activated complex fluoride phosphor is precipitated out while dissolution of the solid silica into the aqueous solution progresses at the same time. While the type of the manganese-activated complex fluoride phosphor is not particularly limited, it should preferably be a manganese-activated potassium hexafluorosilicate represented by the general formula $K_2SiF_6$.

For example, the manganese-activated potassium hexafluorosilicate phosphor production method using the potassium fluoromanganate of the present invention as the raw material may use the aforementioned potassium fluoromanganate as the manganese raw material, and may be: (1) a method wherein two or more types of aqueous hydrofluoric acid solutions, in which at least one or more elements chosen from potassium, silicon and manganese is dissolved, are prepared, the two or more types of aqueous solutions are mixed together, and the manganese-activated potassium hexafluorosilicate phosphor above the saturation solubility level is precipitated out due to a reaction between the elements contained in the aqueous hydrofluoric acid solution; (2) a method wherein each of the elements potassium, silicon and manganese are dissolved, at a desired composition ratio, in an aqueous hydrofluoric acid solution, and for example, alcohol, acetone or water is added to lower the saturation solubility of the manganese-activated potassium hexavluorosilicate phosphor in the aqueous solution, causing precipitation thereof (poor solvent method); and (3) a method wherein a silicon dioxide powder and/or a potassium fluoromanganate powder is added to an aqueous hydrofluoric acid solution in which potassium and/or manganese is dissolved, and the manganese-activated potassium hexafluorosilicate phosphor above the saturation solubility level is precipitated out due to the silicon dioxide powder dissolving in the aqueous hydrofluoric acid solution and reacting with the potassium, manganese and fluorine in the solution.

EXAMPLES

<Synthesis of Potassium Fluoromanganate>

Hereinbelow, the present invention will be explained in further detail by referring to examples of the present invention and comparative examples.

Example 1

The potassium fluoromanganate ($K_2MnF_6$) of Example 1 was produced in accordance with the Bode method described in Non-Patent Document 1. 800 ml of hydrofluoric acid at a concentration of 40 mass % was placed in a fluororesin beaker having a capacity of 2000 ml, and 260 g of a potassium hydrogenfluoride powder (manufactured by Wako Pure Chemical Industries, specialty grade reagent) and 12 g of a potassium permanganate powder (manufactured by Wako Pure Chemical Industries, first grade reagent) were dissolved therein. While stirring this hydrofluoric acid solution, 8 ml of 30% hydrogen peroxide solution (manufactured by Wako Pure Chemical Industries, special grade reagent) was dripped in little by little. When the dripped amount of the hydrogen peroxide solution exceeded a certain amount, a yellow powder began to precipitate, and the color of the reaction solution began to change from violet. After 8 ml of the hydrogen peroxide solution was dripped, stirring was allowed to continue for a while, after which stirring was stopped, and the precipitated powder was allowed to settle. After the powder settled, the operations of removing the supernatant and adding methanol were repeated until the solution became neutral. Thereafter, the precipitated powder was recovered by filtration, then dried, and the methanol was completely removed by evaporation, resulting in the potassium fluoromanganate of Example 1 (referred to as Raw Material A). The potassium fluoromanganate precipitation reaction was performed with the fluororesin beaker set in a constant temperature bath (aqueous ethylene glycol solution) set to −5° C., under conditions in which the temperature of the aqueous solution did not exceed 0° C.

Example 2

In Example 2, a potassium fluoromanganate (referred to as Raw Material B) was synthesized by the same method as that used in Example 1, except that the hydrogen fluoride concentration in the aqueous hydrofluoric acid solution was 60 mass %.

Comparative Example 1

In Comparative Example 1, a potassium fluoromanganate (referred to as Raw Material C) was synthesized by the same method as that used in Example 1, except that the potassium fluoromanganate was precipitated at ambient temperature.

Comparative Example 2

In Comparative Example 2, a potassium fluoromanganate (referred to as Raw Material D) was synthesized by the same method as that used in Example 1, except that the constant temperature bath was set to a temperature of 10° C., and the temperature during the potassium fluoromanganate deposition reaction was 10 to 15° C.

<Potassium and Manganese Concentrations Contained in Potassium Fluoromanganate>

For reference, the concentrations of potassium and manganese contained in the potassium fluoromanganates in Example 1 and Comparative Example 1 (i.e., Raw Material A and Raw Material C) were measured by ICP (Inductively Coupled Plasma) emission spectroscopy. The potassium and manganese concentrations in Raw Material A were respectively 31.9 mass % and 22.2 mass %, and the potassium and manganese concentrations in Raw Material C were respectively 33.0 mass % and 20.9 mass %. In both cases, the concentrations were close to the values of K: 31.6 mass % and Mn: 22.2 mass % calculated by the stoichiometric ratio for potassium fluoromanganate ($K_2MnF_6$).

<X-ray Emission Spectroscopy of Potassium Fluoromanganate>

X-ray photoelectron spectroscopy measurements of the potassium fluoromanganates of Examples 1 and 2 and Comparative Examples 1 and 2 (i.e., Raw Material A, Raw Material B, Raw Material C and Raw Material D) were performed by using a Thermo Fisher Scientific K-Alpha. The potassium fluoromanganate was loaded into a special sample holder for measuring powders and the sample surface was flattened.

The measurement conditions were as follows:
X-ray source: AlKα rays with monochromator
Charge neutralization: coaxial radiation-type dual beam of slow electrons and slow $Ar^+$ ions
Detection angle: 90°
Output Power: 36 W
Measurement area: approximately 400 μm×200 μm
Path energy: 50 eV
Measurement range: 632-670 eV in Mn2p spectrum
Data: taken at 0.1 eV/step for 50 msec, 5 times cumulatively <Analysis of X-ray Photoelectron Spectroscopy Data>

The data obtained by X-ray photoelectron spectroscopy was analyzed by using the analysis software Thermo Avantage packaged with the Thermo Fisher Scientific K-Alpha. Binding energy correction of the resulting binding energy spectrum was performed with a C—C bond (284.8 eV) in the C1s spectrum.

A binding energy spectrum diagram with corrected binding energies for Example 1 (i.e., Raw Material A) is shown in FIG. 1, and in FIG. 2 which is an enlargement of a portion of FIG. 1. In this spectrum diagram, the average count for the signal intensity for binding energies in the range of 633 to 638 eV was used as the background value. Next, the signal intensity value A obtained by subtracting the background value from the count for the maximum signal intensity for binding energies in the range of 643 to 644 eV and the signal intensity value B obtained by subtracting the background value from the count for the maximum signal intensity for binding energies in the range of 645 to 646 eV were determined. The value of the ratio, signal intensity value A/signal intensity value B, was 0.70 for Example 1. Similarly, the values of the ratio, signal intensity value A/signal intensity value B, for Example 2 (Raw Material B), Comparative Example 1 (Raw Material C) and Comparative Example 2 (Raw Material D) were respectively 0.59, 1.31 and 0.97. These values are shown in Table 1.

<Synthesis of Manganese-activated Potassium Hexafluorosilicate Phosphor>

Next, manganese-activated potassium hexafluorosilicate phosphors were synthesized by means of the following method, using the potassium fluoromanganate raw materials of Examples 1 and 2 and Comparative Examples 1 and 2 (i.e., Raw Material A, Raw Material B, Raw Material C and Raw Material D).

Example 3

At ambient temperature, 1000 ml of hydrofluoric acid at a concentration of 55 mass % was placed in a fluororesin beaker having a capacity of 2000 ml, and 127.5 g of a potassium hydrogenfluoride powder (manufactured by Wako Pure Chemical Industries, specialty grade reagent) was dissolved therein to prepare an aqueous solution. While stirring this aqueous solution, 34.5 g of a silicon dioxide powder (manufactured by Denka, FB-50R, amorphous, specific surface area 0.4 $m^2/g$) and 4.5 g of the potassium fluoromanganate powder of Example 1 (Raw Material A) were added. Upon adding the powders to the aqueous solution, the heat of dissolution of the silicon dioxide caused the temperature of the aqueous solution to rise. The solution temperature reached a maximum temperature (approximately 40° C.) approximately 3 minutes after the powders were added, and thereafter, the solution temperature fell due to the completion of the dissolution of the silicon dioxide. Since it was observed that a yellow powder began to be generated in the aqueous solution immediately upon addition of the white silicon dioxide powder, the dissolution of the silicon dioxide powder and the precipitation of the yellow powder occurred at the same time.

After the silicon dioxide powder was completely dissolved, the aqueous solution was stirred for a while, and after the precipitation of the yellow powder was completed, the solution was placed at rest and the solid part was allowed to settle. After the settling of the powder was confirmed, the supernatant was removed, the yellow powder was washed using hydrofluoric acid at a concentration of 20 mass % and methanol, then filtered, the solid part was recovered by filtration, and the remaining methanol was removed by evaporation by means of a drying treatment. After the drying treatment was completed, a nylon sieve with a mesh size of 75 μm was used to classify and recover only the yellow powder that passed through the sieve. The resulting powder was obtained as the manganese-activated potassium hexafluorosilicate phosphor of Example 3 (referred to as Phosphor A).

Example 4

The manganese-activated potassium hexafluorosilicate phosphor (referred to as Phosphor B) of Example 4 was obtained by using the same method as that used in Example 3, except that the potassium fluoromanganate powder of Example 1 which was used in the synthesis of the manganese-activated potassium hexafluorosilicate phosphor in Example 3 was replaced with the potassium fluoromanganate powder of Example 2 (Raw Material B).

Comparative Example 3

The manganese-activated potassium hexafluorosilicate phosphor of Comparative Example 3 (referred to as Phosphor C) was obtained by using the same method as that used in Example 3, except that the potassium fluoromanganate powder of Example 1 which was used in the synthesis of the manganese-activated potassium hexafluorosilicate phosphor in Example 3 was replaced with the potassium fluoromanganate powder of Comparative Example 1 (Raw Material C).

Comparative Example 4

The manganese-activated potassium hexafluorosilicate phosphor of Comparative Example 4 (referred to as Phosphor D) was obtained by using the same method as that used in Example 3, except that the potassium fluoromanganate powder of Example 1 which was used in the synthesis of the manganese-activated potassium hexafluorosilicate phosphor in Example 3 was replaced with the potassium fluoromanganate powder of Comparative Example 2 (Raw Material D).

<X-ray Diffraction Pattern of Manganese-activated Potassium Hexafluorosilicate Phosphor>

For reference, upon using an X-ray diffraction device to measure the X-ray diffraction pattern of the yellow powder of the manganese-activated potassium hexaflurosilicate phosphor obtained in Example 3 (Phosphor A), the pattern was identical to that of potassium hexafluorosilicate ($K_2SiF_6$) crystals, so it was confirmed that the manganese-activated potassium hexafluorosilicate was obtained as a single phase.

<Measurement of Median Size of Phosphor>

The particle size distributions of the manganese-activated potassium hexafluorosilicate phosphors of Examples 3 and 4 and Comparative Examples 3 and 4 (i.e., Phosphor A, Phosphor B, Phosphor C and Phosphor D) were measured by means of a laser diffraction/scattering type particle size measurement device (Beckman Coulter LC13 320) using ethanol as the measurement solvent, and the median size (D50), by volume, of each phosphor was determined from the resulting cumulative particle size distribution curves, and indicated in Table 2. The median sizes of the phosphors of Examples 3 and 4 and Comparative Examples 3 and 4 (Phosphor A, Phosphor B, Phosphor C and Phosphor D) were roughly the same.

<Measurement of Absorption Rate, Internal Quantum Efficiency and External Quantum Efficiency of Phosphor>

The quantum efficiencies and the like when the manganese-activated potassium hexafluorosilicate phosphors of Examples 3 and 4 and Comparative Examples 3 and 4 were excited by blue light with a wavelength of 455 nm at ambient temperature were determined by the following methods.

A standard reflective plate (Labsphere Spectralon) having a reflectivity of 99% was set at a side-surface aperture (φ10 mm) of an integrating sphere (φ60 mm). Monochromatic light divided into a wavelength of 455 nm from a Xe lamp serving as an emission light source was guided to this integrating sphere by an optical fiber, and the spectrum of the reflected light was measured using a spectrophotometer (Otsuka Electronics MCPD-7000). At that time, the number of excitation light photons (Qex) was calculated using the spectrum in the wavelength range of 450 to 465 nm.

Next, recessed cells filled with the phosphor so that the surfaces were flat were set at the aperture of the integrating sphere and irradiated with monochromatic light of wavelength 455 nm, and the spectra of the reflected excitation light and the fluorescent light were measured by the spectrophotometer. The number of photons of the reflected excitation light (Qref) and the number of photons of the fluorescent light (Qem) were calculated from the resulting spectral data. The number of reflected excitation light photons was calculated in the same wavelength range as the number of excitation light photons, and the number of fluorescent light photons was calculated in the range of 465 to 800 nm.

From these three types of photon numbers, the absorption rate=(Qex−Qref)/Qex×100, the internal quantum efficiency=Qem/(Qex−Qref)×100 and the external quantum efficiency=Qem/Qex×100 were determined. The absorption rates, internal quantum efficiencies and external quantum efficiencies of the phosphors of Examples 3 and 4 and Comparative Examples 3 and 4 when excited at a wavelength of 455 nm are shown together in Table 2.

<Production and Reliability Evaluation of Monochromatic Package>

Furthermore, monochromatic packages according to Examples 5 and 6 and Comparative Examples 5 and 6, each mounted with one type of phosphor from among Examples 3 and 4 and Comparative Examples 3 and 4, were produced, and their reliability was evaluated.

<Production of Monochromatic Package>

The phosphor of Example 3 (Phosphor A) was added to a silicone resin (manufactured by Shin-etsu Chemical, KER-2500), defoamed and kneaded, then potted into a surface-mounted type package to which was bonded a blue-light LED element having a peak wavelength of 450 nm, and further thermally cured to produce a monochromatic package according to Example 5. The blending ratio of the phosphor/silicone resin was 30/70 mass %. The total lumi- Comparative Example 4 (Phosphor D) were each prepared, the total luminous flux retention rate of each was measured, and the results are shown together in Table 3.

TABLE 1

|  |  | Example 1 | Example 2 | Comparative Example 1 | Comparative Example 2 |
|---|---|---|---|---|---|
| Potassium fluoromanganate for use as phosphor raw material | Name (Signal intensity value A/signal intensity value B) | Raw Material A 0.70 | Raw Material B 0.59 | Raw Material C 1.31 | Raw Material D 0.97 |

TABLE 2

|  |  | Example 3 | Example 4 | Comparative Example 3 | Comparative Example 4 |
|---|---|---|---|---|---|
| Magnesium-activated potassium hexafluorosilicate phosphor | Name of potassium fluoromanganate used as raw material | Raw Material A | Raw Material B | Raw Material C | Raw Material D |
|  | Name | Phosphor A | Phosphor B | Phosphor C | Phosphor D |
|  | Median size (μm) by volume | 27.8 | 27.6 | 28.7 | 28.3 |
|  | Absorption rate (%) | 84 | 82 | 81 | 79 |
|  | Internal quantum efficiency (%) | 84 | 89 | 76 | 80 |
|  | External quantum efficiency (%) | 71 | 73 | 62 | 63 |

TABLE 3

|  |  | Example 5 | Example 6 | Comparative Example 5 | Comparative Example 6 |
|---|---|---|---|---|---|
| Monochromatic package | Name of phosphor used in monochromatic package | Phosphor A | Phosphor B | Phosphor C | Phosphor D |
|  | Total luminous flux retention rate (%) (85° C. - 85% RH - after 1000 h) | 89 | 90 | 80 | 82 | nous flux when the resulting monochromatic package of Example 5 was supplied with power and caused to emit light was measured by a total luminous flux measurement device manufactured by Otsuka Electronics (combination of diameter 300 mm integrating hemisphere and spectrophotometer/MCPD-9800). Five monochromatic packages were measured for each type of phosphor, and the average value thereof was calculated. Next, in a constant-temperature constant-humidity tank (manufactured by Espec Corp., SH-642), set to a temperature of 85° C. and a relative humidity of 85%, monochromatic packages using each of the fluoride phosphors were supplied with power and lit for 1000 hours, after which the total luminous flux was measured once again, and the total luminous flux retention rate relative to the initial value was calculated. The total luminous flux retention rate for the monochromatic package of Example 5 after being supplied with power and lit for 1000 hours was 89%, and is shown in Table 3.

Similarly, a monochromatic package of Example 6 using the phosphor of Example 4 (Phosphor B), a monochromatic package of Comparative Example 5 using the phosphor of Comparative Example 3 (Phosphor C) and a monochromatic package of Comparative Example 6 using the phosphor of From the results in Tables 1-3, it can be seen that the potassium fluoromanganate of the present invention is a raw material for a manganese-activated complex fluoride phosphor having excellent properties.

The invention claimed is:

1. A manganese-activated complex fluoride phosphor production method wherein, during a step of dissolving a solid silica in an aqueous solution containing at least potassium and fluorine, an operation of adding potassium fluoromanganate to the aqueous solution is performed, and the manganese-activated complex fluoride phosphor is precipitated out while dissolution of the solid silica into the aqueous solution progresses at the same time, and wherein, in an orbital electron binding energy spectrum diagram for manganese obtained by X-ray photoelectron spectroscopy, a ratio (signal intensity value A/signal intensity value B of the potassium fluoromanganate) between a signal intensity value A obtained by subtracting a background value from a maximum signal intensity value for binding energy values within the range from 643.0 eV or more to 644.0 eV or less, and a signal intensity value B obtained by subtracting the background value from a maximum signal intensity value for binding energy values within the range from 645.0 eV or more to 646.0 eV or less of the potassium fluoromanganate, is greater than 0 and no greater than 0.9.

* * * * *